United States Patent [19]

Blöcker

[11] Patent Number: 4,661,579

[45] Date of Patent: Apr. 28, 1987

[54] COMPLETELY AROMATIC POLYESTERS, A PROCESS FOR THEIR PREPARATION AND CORRESPONDING SHAPED ARTICLES

[75] Inventor: Erich Blöcker, Hofheim am Taunus, Fed. Rep. of Germany

[73] Assignee: Hoechst Aktiengesellschaft, Fed. Rep. of Germany

[21] Appl. No.: 714,720

[22] Filed: Mar. 21, 1985

[30] Foreign Application Priority Data

Mar. 24, 1984 [DE] Fed. Rep. of Germany ....... 3410927

[51] Int. Cl.$^4$ ............................................. C08G 63/44
[52] U.S. Cl. .................................... 528/170; 524/602; 528/176; 528/179; 528/180; 528/181; 528/182; 528/190; 528/193; 528/194; 528/206; 528/207; 528/208
[58] Field of Search ................. 528/170, 176, 179–182, 528/190, 193, 194, 206–208

[56] References Cited

U.S. PATENT DOCUMENTS

| | | | |
|---|---|---|---|
| 3,399,172 | 8/1968 | Jaquiss | 528/182 |
| 4,176,223 | 11/1979 | Irwin | 528/170 |
| 4,223,105 | 9/1980 | Igonin | 528/207 |
| 4,383,105 | 5/1983 | Irwin | 528/170 |
| 4,393,190 | 7/1983 | Tyrell et al. | 528/170 |
| 4,393,191 | 7/1983 | East | 528/170 |
| 4,476,184 | 10/1984 | Lubowitz et al. | 528/170 |
| 4,506,064 | 3/1985 | Mark | 528/182 |

FOREIGN PATENT DOCUMENTS

| | | |
|---|---|---|
| 70539 | 1/1983 | European Pat. Off. . |
| 0072540 | 2/1983 | European Pat. Off. . |
| 0076133 | 4/1983 | European Pat. Off. . |
| 0084256 | 7/1983 | European Pat. Off. . |
| 088742 | 9/1983 | European Pat. Off. . |
| 0071447 | 9/1983 | European Pat. Off. . |
| 2187447 | 9/1983 | France . |
| 988828 | 6/1983 | United Kingdom . |

OTHER PUBLICATIONS

The British Polymer Journal, Dec. 1980.
Derwent Abstract JA 61 505/1972.
Derwent Abstracts JA 137707 6/6/79.
Chemical Abstracts vol. 91, 1979.
Article entitled Condensation Monomers.

Primary Examiner—Lucille M. Phynes
Attorney, Agent, or Firm—Connolly and Hutz

[57] ABSTRACT

The invention relates to completely aromatic polyesters in which at least one end of the molecular chains is composed of the radicals

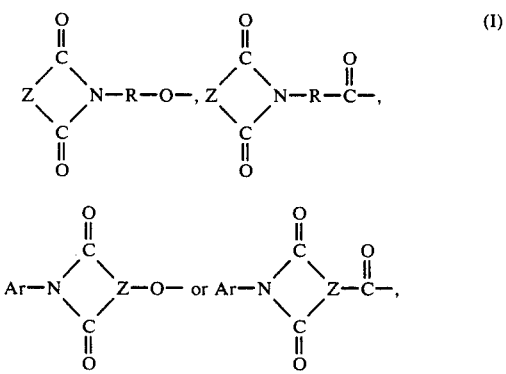

The invention also relates to a process for the preparation of polyesters of this type and to the shaped articles produced therefrom.

The polyesters according to the invention are also open to subsequent solid-phase condensation.

8 Claims, No Drawings

COMPLETELY AROMATIC POLYESTERS, A PROCESS FOR THEIR PREPARATION AND CORRESPONDING SHAPED ARTICLES

Completely aromatic polyesters formed from aromatic dicarboxylic acids and aromatic dihydroxy compounds and/or aromatic hydroxycarboxylic acids have been known for a long time. Shaped structures composed of them have special mechanical properties and good resistance to heat, so that they are suitable for a very wide range of end uses—above all industrial end uses. In general, however, the completely aromatic polyesters have a high melt viscosity, so that preparation and processing using the customary melt processing methods leads to difficulties. In general they require higher processing temperatures than, for example, polyethyleneterephthalate. Many completely aromatic polyesters melt at such high temperatures that high-grade industrial products cannot be prepared from the melt.

The melt viscosity of completely aromatic polyesters at a given temperature is essentially a function of the molecular structure of the starting components and of the molecular weight, i.e. the average chain length of the polymer molecules.

Aromatic polyesters can be divided into those which form an optically isotropic melt and those which form an optically anisotropic melt. The latter are also known as thermotropic, liquid crystal polyesters.

A review of liquid crystal polyesters and patent publications in this field up to 1980 is given by J.-I. Jin et al. in the British Polymer Journal, Volume 12, No.4, pages 132–146 (1980). Examples of recent patent publications on liquid crystal, completely aromatic polyesters are European Patent Applications Nos. 71,447, 72,540, 76,133, 84,256 and 88,742.

The melt polycondensation of completely aromatic polyesters takes place at the latest during the last phase in vacuo, the viscosity of the melt increasing considerably towards the end of the polycondensation. Depending on the composition of the completely aromatic polyesters and especially in the synthesis of liquid crystal polyesters, the melt viscosity of the product can rapidly become so high that stirring in a conventional stirring apparatus is no longer possible (cf. European Patent Application No. 70,539: Comparison Examples 2, 3 and 4, page 30, lines 7–10, page 35, lines 10–15 and page 37, lines 11–13). The rapid increase in melt viscosity takes place particularly readily when completely aromatic polyesters are synthesized from aromatic hydroxycarboxylic acids or ester-forming derivatives thereof. In starting compounds of this type, the two ester-forming groups are always present in a ratio of equivalence, so that the polycondensation can proceed up to the maximum molecular weights without hindrance. In contrast with this, in the synthesis of polyesters from dicarboxylic acids and dihydroxy compounds, equivalence can be disturbed by a slight excess of one component, and regulation of the molecular weight can be achieved by this means.

The possible means of subjecting aromatic hydroxyacids to polycondensation have been described by S. G. Cottis and J. Economy in "Condensation Monomers", published by J. K. Stille and T. W. Campbell, New York 1973, pages 358–360. It is evident from this that decarboxylation is undergone readily not only by the aromatic hydroxy-acids themselves (page 358, chapter C, lines 4–5 and page 359, paragraph 4, lines 9–10), but also by the poly-p-oxybenzoate which has been synthesized from the p-acetoxybenzoic acid, since it decomposes at temperatures as low as 350° C. (page 360, paragraph 1, lines 5–7). On the other hand, polyoxybenzoyl polymers which are stable to heat are obtained if the carboxyl group of the starting compounds is protected by masking in the form of a reactive ester (page 358, last paragraph to page 359, 1st paragraph and page 360, 2nd paragraph).

European Patent Application No. 70,539 relates to the reduction of the high melt viscosity of completely aromatic polyesters. Low-molecular, high-boiling compounds which do not react with the completely aromatic polyester are added to the polyesters for this purpose—preferably as early as in their preparation. The mixture thus formed is less viscous than the polymer melt. After these mixtures have been processed to give shaped structures, the compound which has been added must then be extracted as completely as possible by means of organic solvents. This is only possible, however, if thin film-like or filamentlike structures are prepared from the mixtures. In practice it is associated with high expense and is therefore scarcely practicable.

Polycarbonates and polyester-carbonates containing N-(p-hydroxyphenyl)-phthalimide as end groups are described in U.S. Pat. No. 4,393,190. These polycarbonates and polyester-carbonates were prepared by an interface polycondensation reaction in a two-phase system (methylene chloride/water) from the phenolic components by introducing phosgene in the presence of an organic base. The monofunctional imide compound added serves primarily to improve the stability of these polymers towards chemicals such as carbon tetrachloride, petroleum ether and phosphate esters and also effects a regulation of the molecular weight.

Nothing is stated concerning the possibility of using this imide in the melt polycondensation of completely aromatic polyesters, nor is anything stated about the particular advantages to be achieved thereby.

The object of the present invention was, therefore, to provide completely aromatic polyesters and a process for their preparation, which polyesters are to have—without the necessity of subsequent extraction of a viscosity-reducing substance—a melt viscosity so low that their preparation and processing by means of the conventional melt processing methods can be carried out without difficulties. Furthermore, these completely aromatic polyesters and the shaped articles produced from them are to be so constituted, in accordance with the above object, that a further increase in molecular weight by means of subsequent solid-phase condensation is possible. Preferably, these polyesters are additionally to be as little subject as possible to decarboxylation reactions during preparation and processing, in order thereby to keep at a low level the formation of gas bubbles at elevated temperatures.

This object is achieved, surprisingly, in accordance with the invention by means of completely aromatic polyesters in which the chains of molecules predominantly contain certain aromatic imides as end groups at one end. Completely aromatic polyesters of this type are prepared by carrying out the polycondensation of the condensation reactants in the presence of certain monofunctional, aromatic imides of low volatility as molecular weight regulators.

The present invention therefore relates to completely aromatic polyesters composed essentially of the units

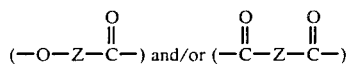

and (—O—Z—O—) in which Z denotes an aromatic ring system, at least one end of the molecular chains being formed from radicals of a molecular weight regulator, wherein the radicals of the molecular weight regulator have the following structure:

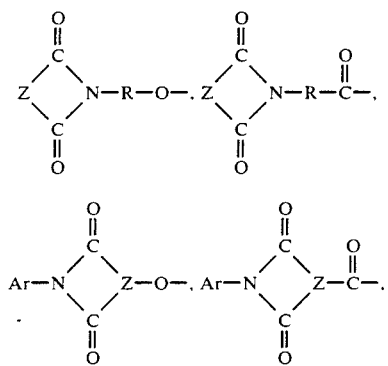

in which Z has the above meaning, R denotes an aromatic, aliphatic or cycloaliphatic group, Ar represents an aromatic group and the imide ring has five or six members.

The invention also relates to a process for the preparation of the above completely aromatic polyesters by the melt condensation of suitable condensation reactants in the presence of a molecular weight regulator, which comprises employing, as the molecular weight regulator, a compound of the following structure or corresponding mixtures:

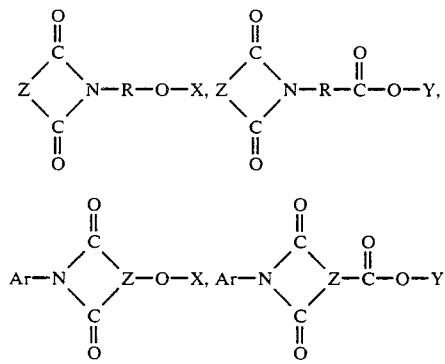

in which Z, R and Ar have the above meaning, the imide ring has five or six members, X is hydrogen or an acyl radical having 2 to 6 carbon atoms and Y is hydrogen or a hydrocarbon radical which can be split off readily under the conditions of the polycondensation, preferably a phenyl radical.

Finally, the invention also relates to shaped articles produced from the above completely aromatic polyesters.

The completely aromatic polyesters according to the invention generally contain up to 5 mole %, preferably 0.2 to 2 mole % and especially 0.5 to 1.5 mole %, based on the total amount of aromatic units forming the polyester, of end groups of the above structure (I).

These end groups can be different, i.e. it is possible to use, in the preparation of the polyester according to the invention, mixtures of molecular weight regulators as described by (II) which contain either XO-groups or YOCO-groups. Preferably, however, the polyester contains, in accordance with the invention, only one type of these end groups in a particular case. In accordance with the invention, these end groups partially or predominantly take the place of the hydroxyl/acyl end groups or the place of the carboxyl end groups (i.e. in each case one of the two end groups) which would be present in the absence of the molecular weight regulator employed in accordance with the invention.

The symbols used above preferably have the following meaning:

Z or Ar=a benzene or naphthalene ring which is unsubstituted or substituted by inert substituents, such as $C_{1-4}$-alkyl, $C_{1-4}$-alkoxy, or halogen, preferably chlorine; R=a divalent benzene or naphthalene ring which is unsubstituted or substituted as above; a divalent aliphatic radical having 1 to 6 carbon atoms; or a divalent cycloaliphatic radical having 6 to 16 carbon atoms, preferably 6 to 10 carbon atoms.

The preparation of the completely aromatic polyesters according to the invention is effected in a known manner by polycondensing suitable, at least bifunctional, monomers in the melt. Examples of suitable monomers of this type are aromatic hydroxy-acids (self-condensation) or mixtures of aromatic dicarboxylic acids and aromatic dihydroxy compounds or a mixture of these mixtures and aromatic hydroxy-acids. The said compounds can be employed as such in this reaction; thus the self-condensation of the aromatic hydroxy-acids can be effected in the presence of certain metal compounds—as described in U.S. Pat. No.4,393,191. In general, however, the ester derivatives of these compounds are preferably used.

Examples of preferred aromatic hydroxycarboxylic acids are: 4-hydroxybenzoic acid, 4-hydroxybiphenyl-4'-carboxylic acid, 3-chloro-4-hydroxybenzoic acid, 3-methoxy-4-hydroxybenzoic acid and 6-hydroxy-2-naphthoic acid.

Examples of preferred aromatic dicarboxylic acids are: terephthalic acid, isophthalic acid, naphthalenedicarboxylic acid, diphenyl-ether-dicarboxylic acid and phenylterephthalic acid.

The following may be mentioned here as preferred representatives of aromatic dihydroxy compounds: hydroquinone, resorcinol, chlorohydroquinone, methylhydroquinone, phenylhydroquinone, t-butylhydroquinone, 4,4'-dihydroxybiphenyl, 4,4'-dihydroxydiphenyl ether, bis-(4-hydroxyphenoxy)-ethane and 2,2-bis-(4-hydroxyphenyl)-propane.

Examples of ester-forming derivatives of the aromatic hydroxycarboxylic acids are the lower alkyl esters or aryl esters or the lower fatty acid esters of the compounds mentioned above. The lower alkyl esters and aryl esters are esters formed by the carboxyl group of the aromatic hydroxycarboxylic acids, whereas the lower fatty acid esters are esters formed by the hydroxyl group of the aromatic hydroxycarboxylic acids. The preferred ester derivatives of aromatic hydroxycarboxylic acids include, for example, phenyl 4-hydroxybenzoate and 4-acetoxybenzoic acid.

Examples of ester-forming derivatives of the aromatic dicarboxylic acids which may be mentioned are the lower alkyl esters or the aryl esters, such as the dimethyl, diethyl, diphenyl and ditolyl esters of the dicarboxylic acids mentioned above. Of these esters, it is preferable to use the diphenyl esters, for example diphenyl terephthalate.

The lower fatty acid esters of the compounds mentioned above, such as, for example, the acetates and propionates, may be mentioned here as examples of ester-forming derivatives of the aromatic dihydroxy compounds. Of these esters, it is preferable to use the acetates, for example hydroquinone diacetate.

The completely aromatic polyesters according to the invention are preferably formed either by employing the aromatic compounds which have an esterified carboxyl group and which then undergo condensation with the free hydroxyl groups with the elimination of an alcohol or phenol, or by using the aromatic compounds which have esterified hydroxyl groups and which then undergo condensation with the free carboxyl groups with the elimination of the lower fatty acids, for example acetic acid or propionic acid.

The polyester-forming monomers used within the scope of this invention can also include, to a certain extent, ester-forming compounds other than the above-mentioned aromatic compounds. For example, aliphatic or alicyclic dicarboxylic acids, such as, for example, adipic acid or 1,4-cyclohexanedicarboxylic acid or esterforming derivatives thereof, can replace up to 30 mole % of the aromatic dicarboxylic acids.

Examples of other compounds which can similarly replace up to 30 mole % of the aromatic dihydroxy compounds are aliphatic or alicyclic diols, such as ethylene glycol, tetramethylene glycol, neopentylglycol and 1,4-cyclohexanedimethanol.

Other compounds which can replace up to 30 mole % of the aromatic hydroxycarboxylic acids are hydroxycarboxylic acids containing an aliphatic hydroxyl group and an aliphatic or aromatic carboxyl group, such as, for example, ε-hydroxycaproic acid, hydroxypivalic acid, 4-[2-hydroxyethoxy]-benzoic acid and 4-[3-hydroxypropoxy]benzoic acid.

The other ester-forming compounds mentioned can be employed on their own or as a mixture of two or more. If two or more of them are used at the same time, the total amount of these non-aromatic compounds should not exceed 30 mole % of the total units forming the polyester.

An essential factor in the condensation process according to the invention is the presence, as molecular weight regulators, of imides of one or more of the following structures:

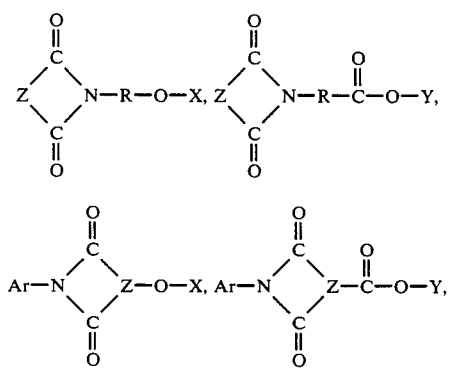

in which Z, R and Ar have the meaning indicated earlier in the text, X is hydrogen or an acyl radical having 2 to 6 carbon atoms and Y is hydrogen or a hydrocarbon radical which is readily eliminated under the conditions of the polycondensation, preferably a phenyl radical. In this case the hydrocarbon component of the acyl radical preferably comprises the $C_{1-4}$-alkyl radical. Examples of the acyl radical are the acetyl radical, the propionyl radical and the n-butyryl radical. The phenyl radical can be unsubstituted or substituted. Suitable substituents in this case are preferably inert substituents, such as $C_{1-4}$-alkyl, $C_{1-4}$-alkoxy or halogen, preferably chlorine.

The following compounds are examples of molecular weight regulators according to the invention, containing a free carboxyl group:

N-[4-carboxyphenyl]-phthalimide ($C_{15}H_9NO_4$), melting point 297° C.,

N-phenylphthalimide-4-carboxylic acid ($C_{15}H_9NO_4$), melting point 264° C. and ε-(1,8-naphthalimido)-caproic acid ($C_{18}H_{17}NO_4$), melting point 130° C.

The following compounds are examples of molecular weight regulators according to the invention, containing a hydroxyl group in the free form or in the form of acetyl derivatives thereof:

N-[4-hydroxyphenyl]-phthalimide ($C_{14}H_9NO_3$), melting point 302° C.

N-[4-acetoxyphenyl]-phthalimide ($C_{16}H_{11}NO_4$), melting point 244° C.

N-[3-hydroxyphenyl]-phthalimide ($C_{14}H_9NO_3$), melting point 236° C.

N-[3-acetoxyphenyl]-phthalimide ($C_{16}H_{11}NO_4$), melting point 138° C.

N-[3-hydroxy-4-methylphenyl]-phthalimide ($C_{15}H_{11}NO_3$), melting point 226° C.

N-[3-acetoxy-4-methylphenyl]-phthalimide ($C_{17}H_{13}NO_4$), melting point 168° C.

5-hydroxy-1-phthalimidonaphthalene ($C_{18}H_{11}NO_3$)

5-acetoxy-1-phthalimidonaphthalene ($C_{20}H_{13}NO_4$), melting point 243° C.

N-[4-hydroxyphenyl]-1,8-naphthalimide ($C_{18}H_{11}NO_3$), melting point >300° C.

N-[4-acetoxyphenyl]-1,8-naphthalimide ($C_{20}H_{13}NO_4$), melting point 238° C.

N-[2-hydroxyethyl]-1,8-naphthalimide ($C_{14}H_{11}NO_3$), melting point 171° C.

These imides containing free hydroxyl or carboxyl groups can be synthesized readily from the corresponding anhydrides, such as phthalic anhydride, 1,8-naphthalic anhydride and trimellitic anhydride, and aliphatic or aromatic amino compounds containing, if appropriate, a free hydroxyl or carboxyl group. The reaction can be carried out advantageously by heating in dimethylformamide, one mole of water being eliminated per imide ring formed. The reactants dissolve in dimethylformamide at room temperature or on being warmed. The mixture is heated at the boil for several hours, and the water of reaction formed is distilled off via the head of a column. The reaction products either crystallize out when the solution is cooled or are precipitated and isolated by pouring the solution into water, with stirring. The acetyl derivatives of the aromatic hydroxy compounds are prepared by heating in acetic anhydride, if appropriate in the presence of small amounts of concentrated sulfuric acid as a catalyst.

The molecular weight regulators according to the invention, containing one imide ring structural unit in the molecule are monofunctional, ester-forming components which are only very slightly volatile under the conditions for the synthesis of aromatic polyesters.

They react with one of the two types of end groups in the components forming the polyester and thereby initially prevent growth of the chain at this end of the polymer chain. If the molecular weight regulator is suitably chosen, it is possible at the same time to mask chemically labile end groups—such as, for example, free carboxyl groups—by ester-formation and thus to protect them.

The molar amount of molecular weight regulator employed determines the molecular weight of the polymer or the chain length which can be reached in the melt polycondensation. Up to 5 mole % of the molecular weight regulators according to the invention, relative to the total amount of condensation reactants, can be added to the starting components of the polyester in order to obtain molecular weights or viscosities of the polymer which are still usable. The greater the amount of molecular weight regulator used, the more slowly the polycondensation reaction takes place. It is preferable to employ 0.2 to 2 mole %, in particular 0.5 to 1.5 mole %, of the molecular weight regulators according to the invention in order to obtain polyesters of sufficiently high molecular weight for practical purposes. However, it is also possible to employ more than 5 mole % of the monofunctional molecular weight regulators if it is intended to prepare, for specific purposes, low-molecular polyesters or oligomers which only react very slowly, or not at all, in the molten state to form higher-molecular products.

The molecular weight regulators according to the invention are preferably added as early as at the start of the polycondensation reaction, i.e. they can be put in at the same time as the polyester starting materials. They can, however, also be added later, in the course of the polycondensation reaction. If, in the synthesis of liquid crystal polyesters, the molecular weight regulator is added during the second half of the polycondensation process, owing to the liquid crystal ranges in the melt which have already been formed, the establishment of equilibrium is, in general, somewhat retarded by the molecular weight regulator, but it nevertheless takes place.

If the molecular weight regulator is added at the start of the polycondensation process, a reaction with the bifunctional starting materials can take place prematurely. However, the formation of polyester in the melt is a reversible process, so that the monofunctional chain terminator can be set free again, depending on the circumstances, as a result of transesterification processes. If the boiling point of a molecular weight regulator is not high enough, it can be at least partially removed by distillation from the reaction mixture in the course of the polycondensation at the high temperatures and under the vacuum applied towards the end of the preparation process. The molecu-lar weight regulators according to the invention, having an imide ring structural unit in their molecule, have proved to be particularly advantageous, because, by virtue of their chemical structure, comprising at least two ring systems and preferably three or four ring systems, they have very high boiling points and, in general, are only very slightly volatile under the preparation conditions customary for aromatic polyesters.

As the result of esterifying the carboxyl end groups of aromatic polyesters with the group of molecular weight regulators according to the invention, which contain a hydroxyl group or an acylated hydroxyl group, the polyester is protected against decarboxylation reactions during processing. Such reactions occur preferably in the case of aromatic polyesters formed from hydroxycarboxylic acids, particularly if they have to be heated to temperatures of 300° C. or higher for processing from the melt. The elimination of carbon dioxide then results in products containing bubbles. In addition, free carboxyl groups can accelerate other undesirable reactions, for example hydrolytic degradation reactions in the polyester.

It has been found, surprisingly, that, in spite of masking the end groups of the aromatic polyesters with the molecular weight regulators according to the invention, a further increase in molecular weight is possible as the result of subsequent solid-phase condensation. This reaction can be effected as a prolonged heat treatment of the solid polymer or of the shaped article prepared from it, preferably a little below the melting point, so that adhesion between the polymer particles or solid surfaces does not occur. Even if the melt viscosity of the resulting polyester containing the molecular weight regulators according to the invention is virtually constant within the customary times of working up and processing, an increase in molecular weight nevertheless takes place if prolonged heating is carried out either in the melt or in the solid state not too far below the melting point.

This prolonged heating is preferably carried out on the shaped article—for example, filaments, films or compression and injection-moulded compounds—in order to obtain the advantage of low melt viscosity during processing. This heat treatment is carried out in a known manner, advantageously in vacuo and/or in a gentle stream of inert gas or air for at least several hours up to several days, depending on the molecular weight desired, the initial molecular weight and the temperature chosen.

The polyesters according to the invention can also contain the customary additives, such as antioxidants, stabilizers, nucleating agents, antistatic agents, flameretarding agents, slip agents, lubricants, plasticizers, pigments, dyestuffs, optical brighteners, demolding auxiliaries and customary fillers, such as glass fibers and the like, in amounts of up to 60% by weight, preferably 1 to 40% by weight, based on the polyester.

The completely aromatic polyesters according to the invention can be readily processed from the melt to give a very wide variety of shaped articles, for example compression molded or injection molded three-dimensional moldings, fibers, filaments, films and tapes. They are suitable for compression and injection molding and can be shaped by means of injection molding processes which are customarily used for the production of moldings. Filaments, fibers or films can be produced by melt-spinning or melt-extrusion.

The shaped articles obtained can, if appropriate, be subjected to a heat treatment, as a result of which their physical properties are improved further. Particularly in the case of fibers and films, the breaking strength and tensile strength are increased by means of this heat treatment.

EXAMPLE 1

(a) 630.0 g of 4-acetoxybenzoic acid (70 mole %), 345.0 g of 6-acetoxy-2-naphthoic acid (30 mole %) and 21.1 g of N-[4-acetoxyphenyl]-phthalimide (1.5 mole % addition) were melted at 250° C. under a stream of nitrogen gas in a 2 l round-bottomed flask equipped with a metal stirrer, a gas inlet orifice and a distillation bridge. The polycondensation reaction then commenced at this temperature, the acetic acid liberated being distilled off. After distillation for 20 minutes, the temperature was raised to 260° C., to 280° C. after a further 20 minutes, to 300° C. after a further 20 minutes and to 320° C. after a further 20 minutes. After a total of 1 hour 40 minutes, 275 ml of acetic acid had distilled off (out of a theoretical 290 ml), and the reaction melt had become cloudy and slightly viscous. The pressure in the reaction system was then reduced, at 320° C., in the course of 40 minutes to less than 1 mbar, in the course of which the stirring speed simultaneously decreased, with the voltage applied to the stirrer motor kept constant. 40 minutes after the vacuum had been applied, the stirring speed had fallen from 150 to 37 minutes$^{-1}$. After a further 50 minutes, the stirring speed was approx. 15 minutes$^{-1}$ at approx. 0.1 mbar. The stirring speed did not change further in the course of a further 30 minutes, i.e. the melt viscosity of the polyester remained virtually constant.

The resulting completely aromatic, liquid crystal polyester had an intrinsic viscosity (i.v.) of 4.7 dl/g, measured in a pentafluorophenol solution at a concentration of 0.1 g/dl at 60° C., calculated by the following formula:

$$I.V. = \frac{\ln \eta rel}{c}$$

in which c denotes the concentration of the solution and ηrel the relative viscosity. The latter is determined in an Ubbelohde viscometer by measuring the flow times of the solution and of pure solvent. Using differential scanning calorimetry (DSC), the polymer exhibited melt endothermic effect at 272° C.. In a heated stage microscope, the polymer melt exhibited double refraction and was thus optically anisotropic.

In order to carry out rheological tests in a capillary rheometer, preforms were prepared by shaping the ground polymer at 175° C. and 600 bar to give sintered articles in the form of candles, free from cavities. These sintered articles were extruded at various temperatures in a conventional capillary rheometer to give ribbons 2 mm thick. At 280° C., for example, the melt viscosity was constant for at least 5 minutes, and no gas bubbles could be detected in the extruded ribbons.

(b) After grinding and drying, the polymer was subjected to solid-phase condensation by being heated at the following temperatures in a rotating flask in a heating bath, in vacuo and under a gentle stream of nitrogen: 2 hours at 190° C., 2 hours at 220° C. and 48 hours at 250° C. The intrinsic viscosity of the polyester had then increased to an i.v. of 5.8 dl/g, and the DSC melting point had risen to 292° C.

COMPARISON EXAMPLE 1

A polyester was prepared from 630.0 g of 4-acetoxybenzoic acid and 345.0 g of 6-acetoxy-2-naphthoic acid as in Example 1, but without the addition of the molecular weight regulator. After 1 hour and 40 minutes, 276 ml of acetic acid had been removed by distillation. The pressure was then reduced as in Example 1, in the course of which the stirring speed fell from 140 minutes$^{-1}$ to approx. 8 minutes$^{-1}$ in the course of 30 minutes, as a result of the rapid increase in viscosity of the melt, so that the polycondensation reaction had to be discontinued rapidly by passing nitrogen through, in order to obtain a melt which was still free-flowing.

The resulting polyester, the end groups of which were not masked, had an intrinsic viscosity i.v. of 6.7 dl/g and exhibited a DSC melt endothermic effect at 270° C.

As in Example 1, preforms were prepared from the polymer after comminution, and were extruded in a capillary rheometer. At 280° C., the melt viscosity of the polyester increased by approx. 50% in the course of 5 minutes. At the start of extrusion, the extruded ribbons were free from bubbles, as judged by a visual assessment of broken pieces. However, as the dwell time of the polymer in the rheometer increased, cavities occurred, the number of which increased with the duration of extrusion.

EXAMPLE 2

The polyester of Example 1 was prepared, with the difference that the molecular weight regulator was added in a smaller amount and later. 14.05 g of N-[4-acetoxyphenyl]-phthalimide (1.0 mole % addition) were added after 1 hour and 40 minutes, and the mixture was stirred for a further 20 minutes under normal pressure and at 320° C., after which a total of 278 ml of acetic acid had been removed by distillation. The pressure was then reduced to less than 1 mbar in the course of 40 minutes, and, at the same time, the stirring speed fell fairly uniformly from 128 minutes$^{-1}$ to 11 minutes$^{-1}$. In the course of a further 10 minutes the stirring speed only decreased slowly to 7 minutes$^{-1}$, after which the polycondensation was terminated.

The resulting polyester had an i.v. of 4.05 dl/g and a melt endothermic effect at 271° C.

After grinding and drying, the polymer was subjected to solid-phase condensation as in Example 1. After 2 hours at 190° C. and 2 hours at 220° C., it was heated at 250° C. for 40 hours. The polyester then had an i.v. of 5.4 dl/g and exhibited a sharp melt endothermic effect at 293° C. A continuation of the solid-phase condensation by heating for 24 hours at 270° C. increased the i.v. to 8.7 dl/g, and the polyester exhibited a sharp melt endothermic effect at 312° C..

EXAMPLE 3

756 g of 4-acetoxybenzoic acid (70 mole %), 414 g of 6-acetoxy-2-naphthoic acid (30 mole %) and 20.8 g of N-[4-carboxyphenyl]-phthalimide (1.3 mole % addition) were subjected to polycondensation as in Example 1. After 1 hour and 40 minutes and after the reaction temperature had been raised from 250° C. to 320° C., 338 ml of acetic acid had been removed by distillation. A vacuum was then applied as in Example 1, whereupon the stirrer speed at a constant control voltage fell from 150 to 25 minutes$^{-1}$ in the course of 40 minutes, and to 9 minutes$^{-1}$ in the course of a further 25 minutes and then remained constant for 30 minutes. The resulting polyester had an i.v. of 5.0 dl/g and a melt endothermic effect at 268° C..

EXAMPLE 4

252.0 g of 4-acetoxybenzoic acid (35 mole %), 230.0 g of 6-acetoxy-2-naphthoic acid (25 mole %), 132.8 g of terephthalic acid (20 mole %), 155.2 g of hydroquinone diacetate (20 mole %) and 16.9 g of N-[4acetoxyphenyl]-phthalimide (1.5 mole % addition) were subjected to polycondensation as in Example 1, and a vacuum was applied after 1 hour and 40 minutes at 320° C.

and was reduced to less than 1 mbar in the course of 40 minutes. The melt viscosity only increased slowly. After 4 hours and 40 minutes the stirrer speed had fallen from 150 to 25 minutes$^{-1}$ and it remained constant during the next 30 minutes.

The resulting liquid crystal polyester had an i.v. of 4.3 dl/g.

COMPARISON EXAMPLE 2

Example 4 was repeated, but without adding the phthalimide derivative. During the vacuum phase of the polycondensation process, the stirrer speed fell from 150 to 7 minutes$^{-1}$ in the course of 2 hours and 45 minutes, with a tendency to fall further, so that the polycondensation reaction had to be discontinued. The resulting liquid crystal polyester had an i.v. of 5.7 dl/g.

EXAMPLE 5

239.8 g of 4-acetoxybenzoic acid (33.3 mole %), 221.1 g of terephthalic acid (33.3 mole %), 258.4 g of resorcinol diacetate (33.3 mole %) and 16.9 g of N-[4-acetoxyphenyl]-phthalimide (1.5 mole % addition) were subjected to polycondensation as in Example 1, and a vacuum was applied after 1 hour and 40 minutes at 320° C., and was reduced to less than 1 mbar in the course of 40 minutes. 4 hours after the start of the vacuum phase, the stirrer speed had fallen from 150 to 6-7 minutes$^{-1}$, the fall in the last 1 to 2 hours taking place very slowly.

The resulting amorphous polyester had an i.v. of 0.82 dl/g, determined as described in Example 1, and exhibited a glass transition temperature at 142° C. in the DSC.

COMPARISON EXAMPLE 3

Example 5 was repeated without adding the phthalimide derivative. As soon as 40 minutes after the start of the vacuum program at 320° C., the stirrer speed had fallen from 150 to approx. 5 minutes$^{-1}$, so that the polycondensation reaction had to be discontinued rapidly. The amorphous polyester had an i.v. of 1.58 dl/g.

EXAMPLE 6

378 g of 4-acetoxybenzoic acid (30 mole %), 207 g of 6-acetoxy-2-naphthoic acid (30 mole %) and 14.9 g of N-[4-acetoxyphenyl]-1,8-naphthalimide (1.5 mole %) were subjected to polycondensation in a 1 'I roundbottomed flask as in Example 1. After 1 hour and 30 minutes and a progressive increase in the temperature from 250° to 320° C., 167 ml of acetic acid had been removed by distillation. A vacuum was then applied and the pressure was reduced to less than 1 mbar in the course of 40 minutes. After 1 hour and 40 minutes of the vacuum program, the stirrer speed had fallen from 150 to 33 minutes$^{-1}$, and it remained constant during the next 30 minutes. The resulting liquid crystal polyester had an i.v. of 5.5 dl/g and a melt endothermic effect at 269° C.

I claim:

1. A completely aromatic polyester composed essentially of the units

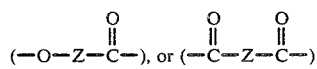

and (—O—Z—O—) or the combination in which Z denotes an aromatic ring system, at least one end of the molecular chains being formed from radicals of a molecular weight regulator, wherein the radicals of the molecular weight regulator have the following structure:

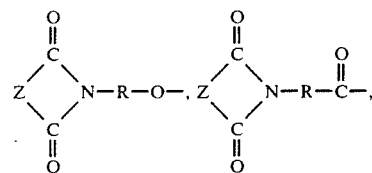

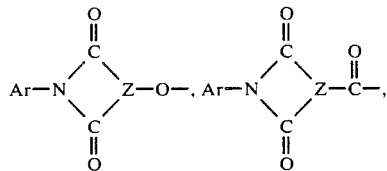

Z or Ar denotes a benzene or naphthalene ring which is unsubstituted or substituted by inert substituents, R denotes a divalent benzene or naphthalene ring which is unsubstituted or substituted as above; a divalent aliphatic radical having 1 to 6 carbon atoms; or a divalent cycloaliphatic radical having 6 to 16 carbon atoms.

2. A completely aromatic polyester as claimed in claim 1, wherein the end groups amount to 0.2 to 2 mole % of the aromatic units forming the polyester.

3. A completely aromatic polyester as claimed in claim 1, which forms an optically anisotropic melt.

4. A process for the preparation of the completely aromatic polyesters as claimed in claim 1 by the melt condensation of suitable condensation reactants in the presence of a molecular weight regulator, wherein a compound of the following structure or corresponding mixtures are employed as the molecular weight regulator:

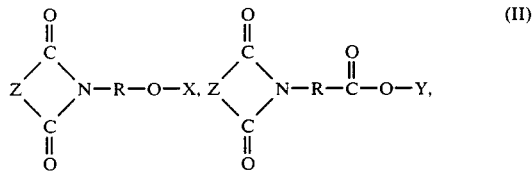

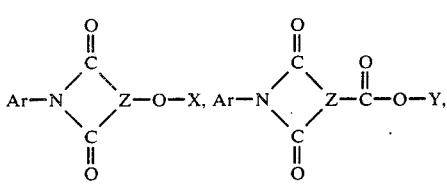

in which Z, R and Ar have the above meaning, the imide ring has five or six members, X is hydrogen or an acyl radical having 2 to 6 carbon atoms and Y is hydrogen or a hydrocarbon radical which is readily eliminated under the conditions of the polycondensation reaction.

5. The process as claimed in claim 4, wherein the molecular weight regulator is used in amounts of 0.2 to 2 mole %, based on the total amount of bifunctional condensation reactants.

6. The process as claimed in claim 4, wherein solid-phase condensation is additionally carried out after the melt condensation.

7. A shaped article of the polyester of claim 1.

8. A shaped article as claimed in claim 7 comprising at least 40% by weight of the polyester and as an ingredient antioxidant, stabilizer, nucleating agent, antistatic agent, flame-retarding agent, slip agent lubricant, plasticizer, pigment, dyestuff optical brightener, demoulder or filler in an amount up to 60% by weight based on the polyester.

* * * * *